(12) United States Patent
Menon

(10) Patent No.: US 6,327,671 B1
(45) Date of Patent: Dec. 4, 2001

(54) DELTA COMPRESSED ASYNCHRONOUS REMOTE COPY

(75) Inventor: Jaishankar Moothedath Menon, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/195,187

(22) Filed: Nov. 18, 1998

(51) Int. Cl.⁷ .................................................. H02H 3/05
(52) U.S. Cl. ........................ 714/6; 714/100; 711/100; 707/200
(58) Field of Search ........................... 714/6, 5, 20, 54, 714/100; 711/100, 154, 162, 165; 707/200, 201, 204

(56) References Cited

U.S. PATENT DOCUMENTS

| | | | |
|---|---|---|---|
| 5,212,784 | * 5/1993 | Sparks | 714/6 |
| 5,412,668 | 5/1995 | Dewey | 371/40.1 |
| 5,463,772 | * 10/1995 | Thompson et al. | 707/101 |
| 5,524,217 | 6/1996 | Sone et al. | 395/288 |
| 5,548,711 | 8/1996 | Brant et al. | 395/182.03 |
| 5,574,950 | 11/1996 | Hathorn et al. | 395/861 |
| 5,592,618 | 1/1997 | Micka et al. | 395/185.07 |
| 5,680,580 | 10/1997 | Beardsley et al. | 395/489 |
| 5,692,155 | 11/1997 | Iskiyan et al. | 395/489 |
| 5,742,792 | 4/1998 | Yanai et al. | 395/489 |
| 5,778,395 | * 7/1998 | Whiting et al. | 707/204 |
| 5,867,732 | * 2/1999 | Young | 395/872 |
| 6,131,148 | * 10/2000 | West et al. | 711/162 |
| 6,202,136 | * 3/2001 | Wikle et al. | 711/162 |

* cited by examiner

Primary Examiner—Robert Beausoleil
Assistant Examiner—Rita Ziemer
(74) Attorney, Agent, or Firm—James C. Pintner Helker, Ehrman, White & McAuliffe, Fleit, Kain, Gibbons, Gutman & Bongini P.L.

(57) ABSTRACT

A data storage facility provides a remote copy operation that copies data write updates from a primary data store to a remote site by identifying which bytes in a block update have changed and sending only the changed bytes from the primary data store to the remote site. An exclusive-OR (XOR) logic operation is used to identify the changed bytes by XOR'ing the original data block with the changed block. Data compression can then be used on the XOR data block to delete the unchanged bytes, and when the compressed block is sent to the remote site, only the unchanged bytes will be sent, thereby reducing the bandwidth needed between the primary store and the remote site.

38 Claims, 6 Drawing Sheets

DELTA COMPRESSED ASYNCHRONOUS REMOTE COPY

BACKGROUND OF THE INVENTION

1. Field of the Invention

This invention relates generally to copying of data transactions and, more particularly, to copying data write updates from a primary location to a remote location.

2. Description of the Related Art

Remote copying of data is an integral part of disaster recovery for protecting critical data from loss and providing continuous data availability. In a disaster recovery support system, data write updates to a primary or central data store are reproduced at a secondary, remote site. The remote site is typically located at a distance from the primary data store if protection from natural disasters is a concern, but may be adjacent to the primary site if equipment failure is the main concern. In the event of a failure at the primary data store, the remote site can take over all operations, including data write updates, with confidence that no data has been lost. Later, after repair, the primary data store can be restored to the condition of the remote site and can resume all operations, including data write operations.

Examples of disaster recovery systems are the Peer-to-Peer Remote Copy (PPRC) function of enterprise data storage systems from the International Business Machines Corporation (IBM Corp.) and the Symmetrix Remote Data Facility (SRDF) system from the EMC Corporation. Such remote copying functions are also referred to as real-time data shadowing, electronic vaulting, and data mirroring.

For remote copying in the context of data shadowing, typically same-sized blocks of data are sent from the primary data store to the remote data site. In this way, data write updates at the primary data store are reproduced at the remote site so as to permit reconstruction of the data, including reconstruction of the exact sequence of data write updates that took place at the primary data store. This reproducibility can be especially important, for example, in a banking system or other transaction log system. Thus, data write updates at the primary data store are collected and are periodically sent to the remote site in a remote copy operation.

There are synchronous and asynchronous forms of remote copy. The difference relates to when the host computer at the primary data store is informed of the completion of the data shadowing operation. In a synchronous remote copy operation, completion of a remote copy write request is indicated to the host computer only after the data has been written to both the primary data store and the data controller at the remote site. In an asynchronous remote copy operation, the completion of the write request is indicated as soon as the primary data store controller completes the write operation at the primary site. Thus, in an asynchronous remote copy operation, the primary data store controller does not wait for the remote site controller to complete its write operation; data shadowing at the remote site occurs asynchronously to the primary data store.

A key aspect of asynchronous remote copy is that updates at the remote site must be applied by the remote controller in the same order as they are applied by the primary data store controller, even though the primary controller does not wait for confirmation of the remote copy to ensure sequential updates. A key aspect of synchronous remote copy is that waiting for the remote copy confirmation carries with it a high response time penalty, which increases with the distance between the primary data store and the remote site. Because of its greater speed, the asynchronous form of remote copy has been getting increasingly greater interest.

The various types of remote copy can require enormous amounts of bandwidth over the data lines between the primary data store and the remote site controller. For example, if a primary data store controller can support 20,000 input/output (I/O) operations per second, and if 50% of these operations are write operations, then the controller can handle 10,000 write operations per second. If each write update involves 4 K bytes, then bandwidth of 40 MB per second is required between the primary controller and the remote site controller. This is a significant amount of bandwidth to provide, given currently available pricing for data lines. Even though asynchronous remote copy can speed up write updates, it does not decrease the amount of bandwidth required.

From the discussion above, it should be apparent that there is a need for a remote copy system that can provide quick data shadowing without requiring a great deal of expensive bandwidth. The present invention fulfills this need.

SUMMARY OF THE INVENTION

The present invention provides a remote copy operation that copies data write updates from a primary data store to a remote site by identifying which bytes have changed and sending only the changed bytes from the primary data store to the remote site. A data operation such as an exclusive-OR (XOR) logic operation can be used to identify the changed bytes. Many data storage systems include XOR facilities as part of their normal configuration, including systems that implement the well-known RAID-type data storage. The XOR operation is used on the write updated block of data to be copied. Data compression can then be used on the XOR data block to delete the unchanged bytes, and then only the changed bytes are sent to the remote site. This reduces the amount of data being sent between the primary data store and the remote site, and reduces the bandwidth required between the sites. In this way, the remote copy system of the invention provides remote copying without requiring a great deal of expensive bandwidth.

Other features and advantages of the present invention should be apparent from the following description of the preferred embodiments, which illustrates, by way of example, the principles of the invention.

DESCRIPTION OF THE PREFERRED EMBODIMENTS

Figure 1:
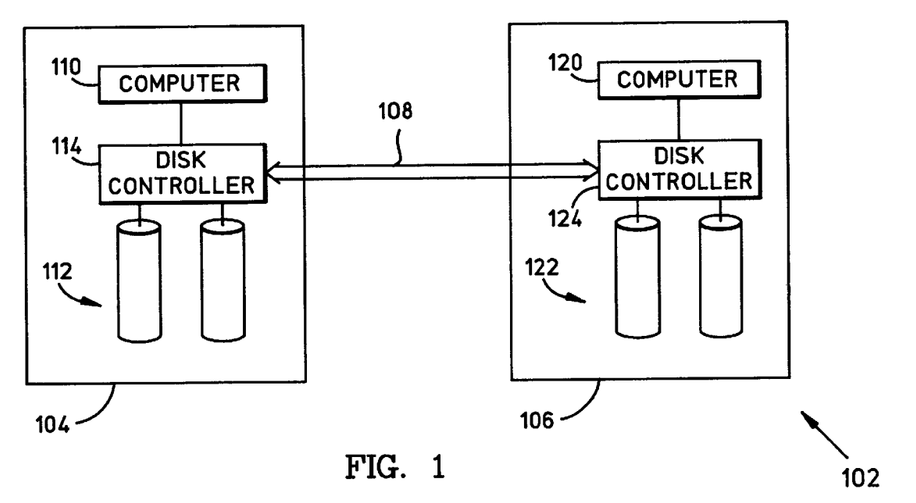
FIG. 1 is a block diagram of a computer storage facility showing a primary data store and a remote data site constructed in accordance with the present invention.

FIG. 1 illustrates an exemplary computer storage facility 102 that includes a primary data store 104 and a remote data store 106 that are connected by a high-speed data line 108. The primary data store includes a computer 110 that receives data updates and propagates those into a data base stored in disk storage 112 through a disk controller 114. The computer storage facility 102 implements a remote copy operation of the primary data store 104, copying data updates comprising changed blocks of data in the disk storage 112 from the primary data store 104 to the remote site 106 over the data line 108. In accordance with the present invention, the computer storage facility 102 implements the remote copy operation by identifying which bytes in the update have changed and sending only the changed bytes from the primary data store to the remote site. This reduces the amount of data being sent between the primary data store 104 and the remote site 106 and reduces the bandwidth required between the sites to support the remote copy operations. In this way, the data storage facility 102 provides remote copying without requiring extensive amounts of bandwidth.

The computer 110 of the primary data store 104 can be any general purpose computer that is used in conjunction with a data storage subsystem having one or more data storage devices, such as the illustrated disk drives 112, which operate under control of the disk controller 114. The computer 110 can comprise, for example, a Model 3090 or AS 4000 computer by IBM Corporation.

The remote site 106 also includes a computer 120, which can be of the same type as that of the primary data store 104 or can be any other suitable computer. The remote site 106 receives data write updates from the primary data store 104 and places them into one or more data storage devices 122 through a disk controller 124. In the illustrated embodiment, the storage devices comprise disk drives. It should be understood, however, that the storage devices 122 can comprise a wide variety of storage devices, including tape storage and recordable optical disk data storage. In addition, the remote site may initially store data write updates into non-volatile storage (NVS), such as semiconductor memory, to be destaged at a later time to the disk data storage devices. The high-speed data line 108 may comprise, for example, a connection commonly referred to as a T1 or DS1 line, or may comprise an Integrated Services Digital Network (ISDN) line, or any of a wide variety of other connections suitable for transferring large blocks of digital data.

Figure 2:
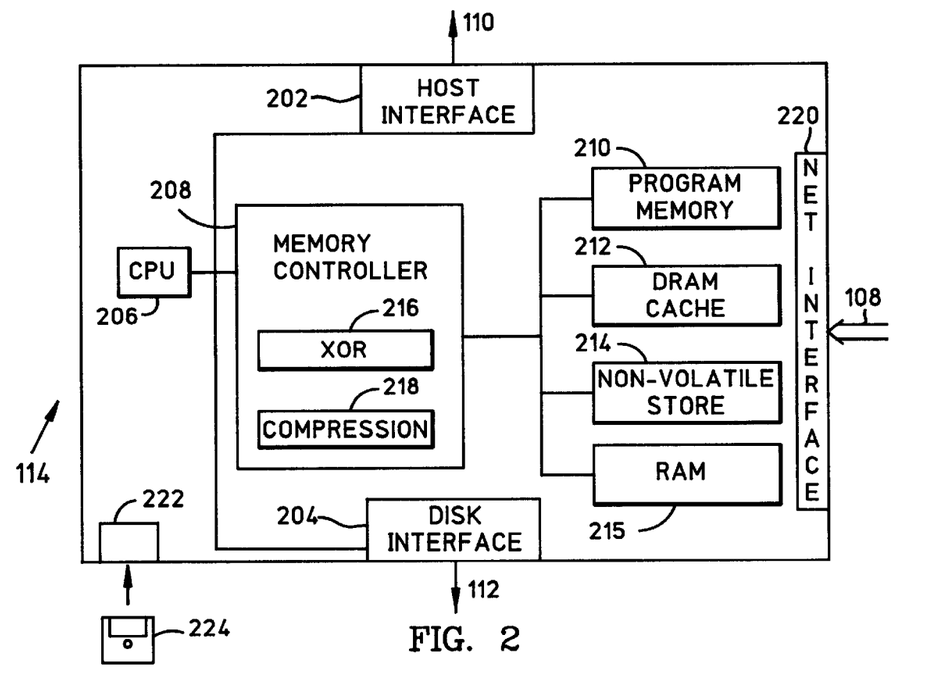
FIG. 2 is a block diagram showing construction details of the primary data store illustrated in FIG. 1.

FIG. 2 shows details of the disk controller 114 of the primary data store 104. It should be noted that the disk controller 124 of the remote site 106 can have a similar construction. The disk controller 114 receives data write updates from the computer 110 through a host computer interface 202. After data update identification steps described below, the data write update information is provided to the storage devices 112 through a disk interface 204. The data transfer from the host computer interface 202 to the disk interface 204, as well as all other operations of the disk controller, take place under control of the disk controller central processing unit (CPU) 206.

The disk controller 114 also includes a memory controller 208 and a program memory 210, a dynamic random access memory (DRAM) data cache 212, and a non-volatile storage 214. The disk controller also can include volatile RAM 215 for storage of computations such as might be necessary for exclusive-OR (XOR) logical computations and the like. In the preferred embodiment, however, the memory controller 208 includes an XOR logic engine 216 that performs an XOR operation between a data block in an initial condition and that same data block changed with data write updates, and also includes data compression logic 218 that deletes redundant data bytes between two data block versions. It is common in large data storage systems such as RAID (Redundant Arrays of Inexpensive Disks) systems to include an XOR engine and data compressor, because the RAID format requires data storage by executing an XOR operation between original data files and changed data files before storage to the RAID disk storage subsystem occurs.

The disk controller 114 also includes a data line interface 220 for communication over the high-speed data line 108 (FIG. 1). The disk controller also has access to a storage media processor 222, which is illustrated as part of the disk controller but actually may be part of the host computer 110. In any case, the storage media processor accepts a signal-bearing medium, such as a floppy disk 224, on which a program of machine-readable instructions may be stored and read by the storage media processor. The program instructions can then be stored in the program memory 210 and executed under control of the disk controller CPU 206.

Figure 3:
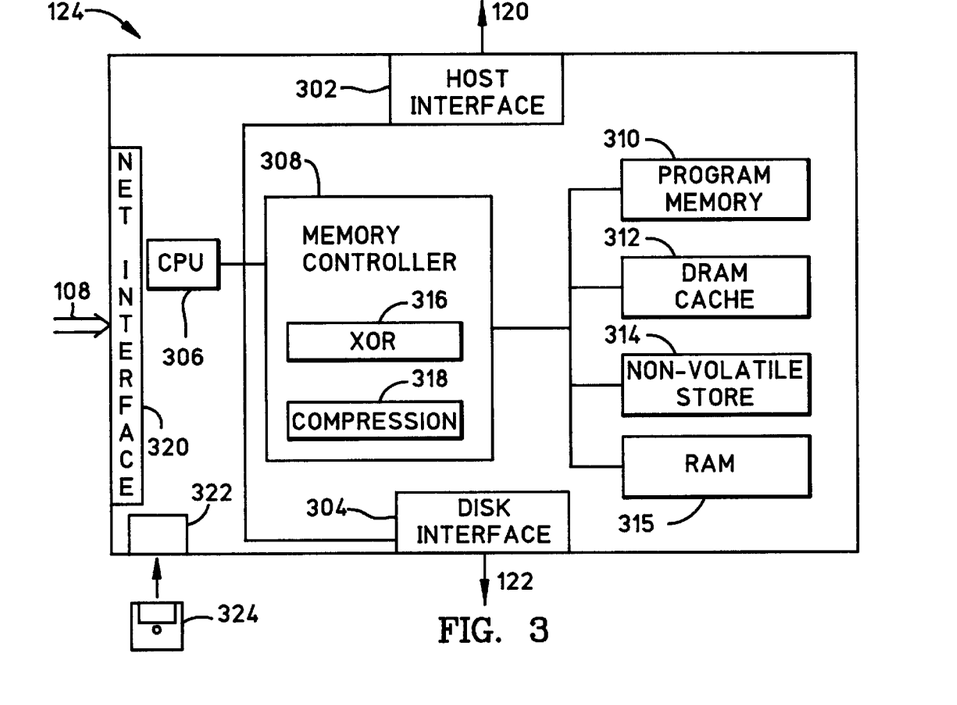
FIG. 3 is a block diagram showing construction details of the remote data site illustrated in FIG. 1.

FIG. 3 is a block diagram showing construction details of the disk controller 124 of the remote data site 106 illustrated in FIG. 1. It should be apparent that the disk controller 124 of the remote site 106 has a similar construction to that of the primary data store disk controller 114. Thus, the remote site disk controller 124 includes a host computer interface 302 to the remote site host computer 120 and includes a disk interface 304 to the remote site data store 122. The remote site disk controller also includes a CPU 306, a memory controller 308, a program memory 310, a DRAM cache 312, a non-volatile store (NVS) 314, and an optional RAM 315 for storage of computations and the like.

The remote site disk controller 124 of FIG. 3 also includes a data line interface 320 to the high-speed data line 108, over which it communicates with the primary data store 104. Like the primary data store, the remote site disk controller 124 also has access to a storage media processor 322, which is illustrated in FIG. 3 as part of the disk controller 124 but actually may be part of the host computer 120. As with the primary store controller, the storage media processor 322 accepts a signal-bearing medium, such as a floppy disk 324, on which a program of machine-readable instructions may be stored and read by the storage media processor, to be stored in the program memory 310 and executed under control of the disk controller CPU 306.

Figure 4:
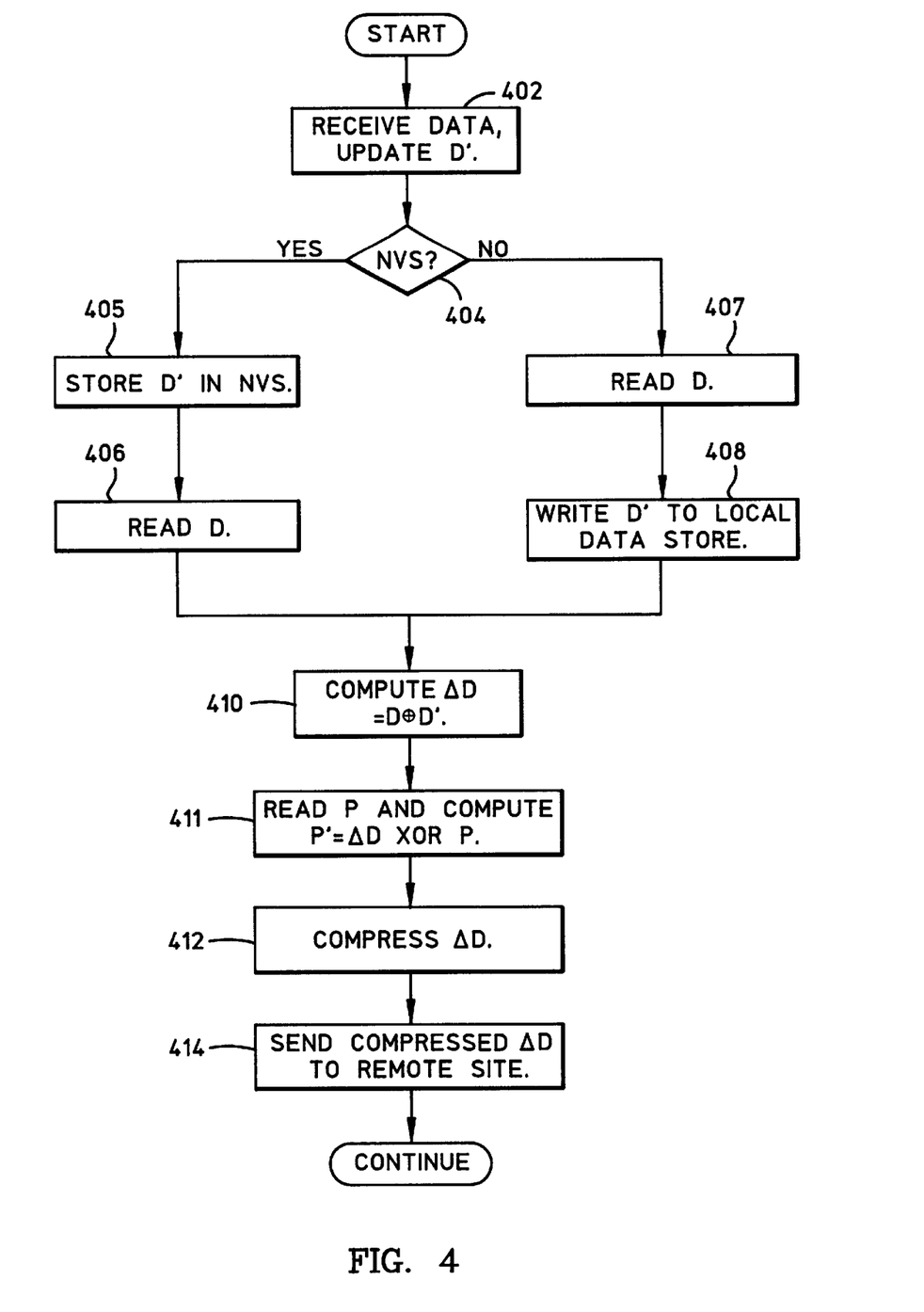
FIG. 4 is a flow diagram that illustrates the operational steps performed by the primary data store illustrated in FIG. 1.

FIG. 4 is a flow diagram that illustrates the operating steps performed by the disk controller 114 at the primary store 104. Program code to implement these operating steps is stored in the program memory 210 and is executed under the control of the disk controller CPU 206. The first operating step, represented by the FIG. 4 flow diagram box numbered 402, is for the primary store disk controller to receive a data update write operation. The update to an exemplary block of data called D will be referred to as updated block D', and represents the new value of the block D. The next disk controller step is to check for the presence of high-speed, non-volatile store (NVS), such as powered semiconductor RAM or the like. This checking step is represented by the flow diagram box numbered 404. If there is NVS in the disk controller, a positive outcome at the decision box 404, then the new updated block D' is stored in the NVS. This step is represented by the flow diagram box numbered 405. The block D is needed for the upcoming computation of a change file called ΔD, described below, so in the next step 406, the block D is read from the local data store at the primary site.

If there was no NVS located in the checking step, a negative outcome at the decision box 404, then the new block D' must be written to local data store. When that happens, the original D in local store will be overwritten. Because D is needed for the ΔD computation, the original block D is first read from local store. This step is represented by the flow diagram box numbered 407. Next, the updated block D' is written to local data store of the primary disk controller 114, as indicated by the flow diagram box numbered 408. This step is taken because the exemplary system implements a RAID storage system, and the updated block D' is needed for subsequent parity operations. That is, storing the updated D' block in local store, if there is no NVS, preserves the D' block for the parity operations.

Next, processing proceeds to the computation of ΔD, where ΔD is given by Equation (1):

$$\Delta D = D \text{ XOR } D' \tag{1}$$

where D is the original version of the exemplary block and D' is the updated version of the block. That is, ΔD is computed by first reading D from local store and then XOR'ing block D with block D'. The XOR computation of ΔD is represented by the FIG. 4 flow diagram box numbered 410. Next, as indicated by the flow diagram box numbered 412, the primary store disk controller compresses the ΔD file. The compressed ΔD file is then sent to the remote site 106 over the data line 108, as represented by the flow diagram box numbered 414. Other disk controller operations can then continue, as in the preferred embodiment the remote copy operations are carried out asynchronously.

It should be noted that, for an asynchronous remote copy operation, the disk controller at the primary site will generate an indication that the write request to store D' is completed as soon as the D' store operation is completed. This occurs at step 406 in the case of NVS, and otherwise at step 408. Remaining store computations can occur later. If the system has NVS, then the D' will eventually be destaged to disk store, along with updated parity P', after the NVS becomes full. For a synchronous copy operation, the write completion at the primary site is generated after the new P' is computed, after step 411.

Figure 5:
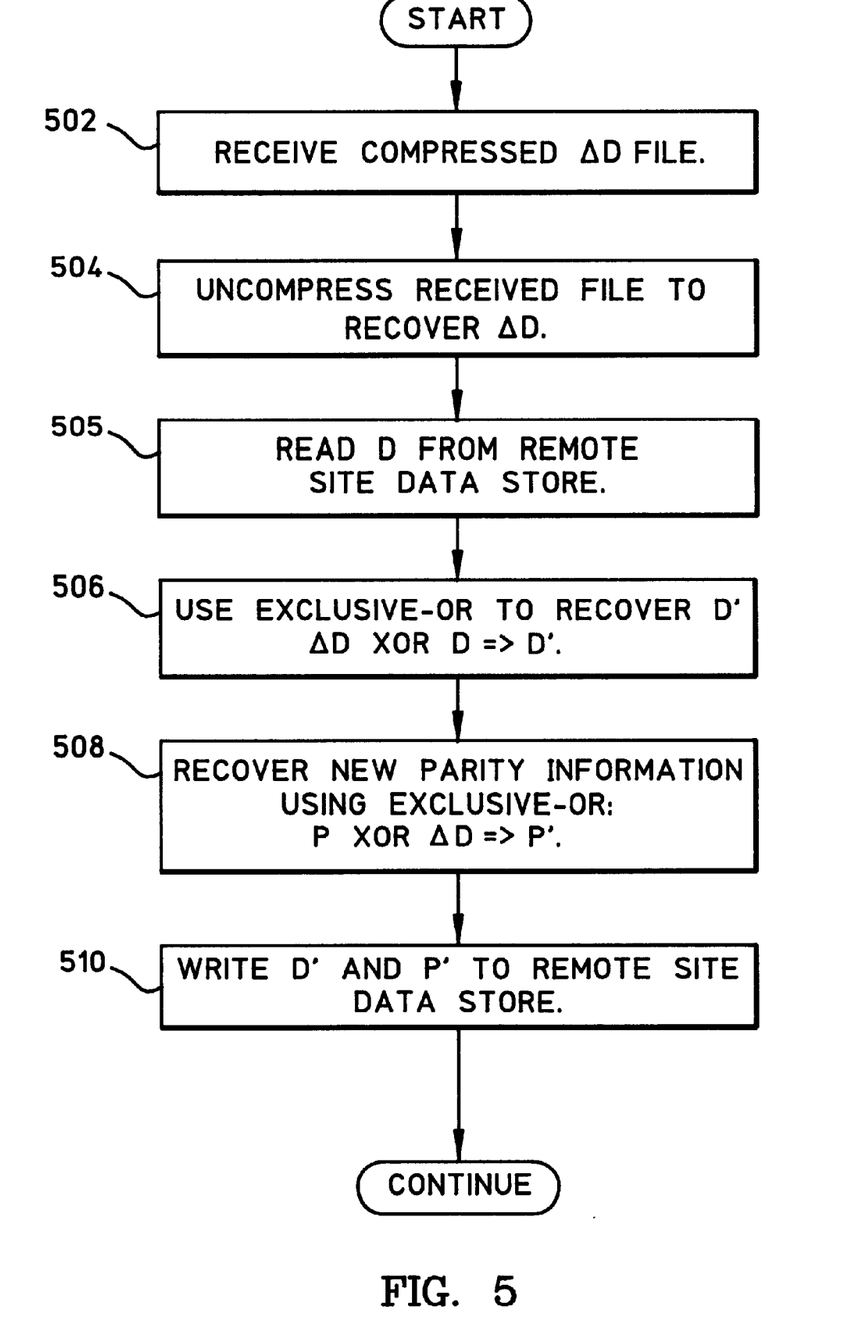
FIG. 5 is a flow diagram that illustrates the operational steps performed by the remote data store illustrated in FIG. 1.

FIG. 5 is a flow diagram that illustrates the operating steps performed by the disk controller 124 at the remote site 106. Program code to implement these operating steps is stored in the program memory 310 and is executed under the control of the remote site disk controller CPU 306. The first operating step, represented by the FIG. 5 box numbered 502, is for the remote site disk controller to receive a compressed ΔD file from the primary data store. The next step for the remote site disk controller is to uncompress the received file, thereby recovering the change file ΔD. This step is represented by the flow diagram box numbered 504.

To recover the update block D', the original block D will be needed. In particular, after the ΔD file is uncompressed, the disk controller must obtain the write update block D' using the logical exclusive-OR operator (XOR) to undo Equation (1). That is, the remote site disk controller makes use of Equation (2):

$$D' = \Delta D \text{ XOR } D. \tag{2}$$

This requires reading the block D from the remote site data store, as represented by the flow diagram box numbered 505.

With ΔD and D thus obtained, the XOR computation of Equation (2) can be implemented, as represented by the flow diagram box numbered 506. With the D' block thereby obtained, in a RAID data store system, proper updating of the mirrored data set next requires obtaining the new parity block, called P', using a similar undo process indicated by Equation (3):

$$P' = P \text{ XOR } \Delta D, \tag{3}$$

which is a relationship well-known to those skilled in the art of data storage systems and is represented by the flow diagram box numbered 508. When the D' and P' files are obtained, they are appropriately written to the remote site data store 122, as indicated by the flow diagram box numbered 510. Disk controller operations then continue.

It should be noted that steps 505 through 510 of the remote site controller operation can incorporate steps similar to those described for FIG. 4 with respect to checking for NVS and taking appropriate action. Those skilled in the art will understand how to incorporate NVS utilization at the remote site, in view of the FIG. 4 description, without further explanation.

Figure 6:
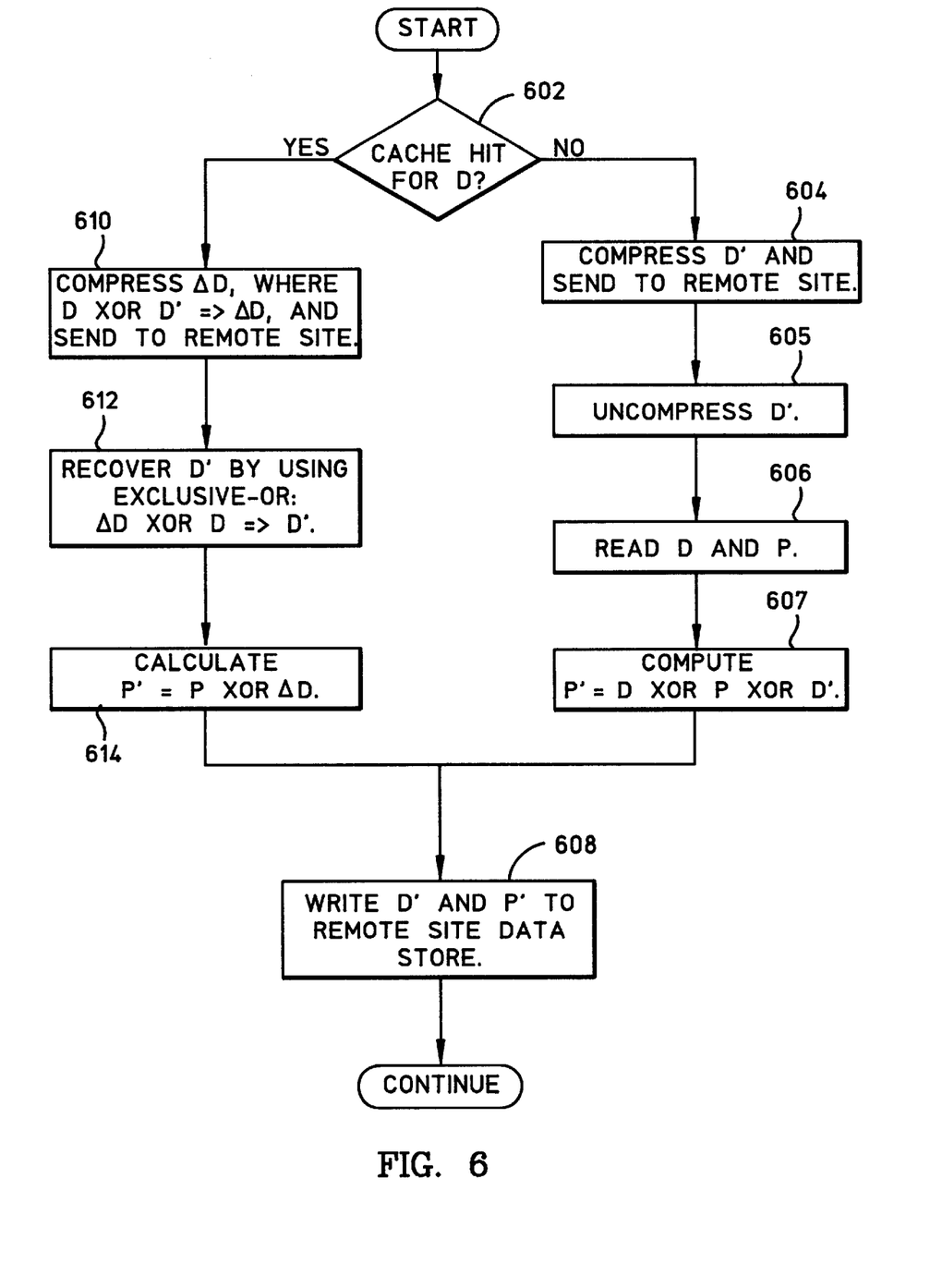
FIG. 6 is a flow diagram that illustrates the operational steps performed by the computer storage facility illustrated in FIG. 1 when checking for cache hits.

A number of system operating configurations are possible without departing from the present invention. For example, the presence of primary store cache can be used to reduce the number of data operations needed in the overall system 102. FIG. 6 is a flow diagram that illustrates the operating steps carried out by the system components, as indicated, for checking primary store cache. In the first operating step, represented by the decision box numbered 602, the primary store disk controller checks for a hit in the DRAM cache 212.

In FIG. 6, if there is no cache hit, a negative outcome at the decision box 602, then the update block D' is compressed and immediately sent to the remote site. This step is represented by the flow diagram box numbered 604. In the next step, represented by the flow diagram box numbered 605, the compressed D' block is received at the remote site and is decompressed to recover the D' block. To compute the P' and for further RAID operations, the D block and P block must be read from local store at the primary store and at the remote site. This step is represented by the flow diagram box numbered 606. The recovered D' block, the D block, and the P block are used to calculate the P' block at the primary store and remote site, as represented by the flow diagram box numbered 607. These values are then written to data store at the remote site, as indicated by the flow diagram box numbered 608.

If there is a cache hit at the primary store, a positive outcome at the decision box 602, then the D' block is used to calculate the ΔD file, using Equation (1) above and using the D block in the cache, and then the ΔD file is compressed and sent to the remote site. This step is indicated by the flow diagram box numbered 610. At the remote site, represented by the flow diagram box numbered 612, the compressed ΔD is received and the D' updated block is recovered using Equation (2) given above. Thus, ΔD is decompressed, D is obtained from cache, and D' is recovered at the remote site. The new parity block P' also is computed at the primary and remote sites, using block P and ΔD, and Equation (3), as indicated by the flow diagram box numbered 614. With the D' updated block recovered and new P' computed, processing can proceed with the box 608, where D' and P' are written to the remote site data store.

It should be noted that those skilled in the art will appreciate that the operational steps described above can be modified if NVS is to be taken into account. Again, those skilled in the art will understand how to incorporate NVS utilization for the FIG. 6 operation, in view of the FIG. 4 description, without further explanation.

In another operating configuration of the overall system 102, the primary store 104 can check for sequential write operations to reduce the number of computations and disk operations when calculating new parity. This operating configuration is illustrated in FIG. 7.

Figure 7:
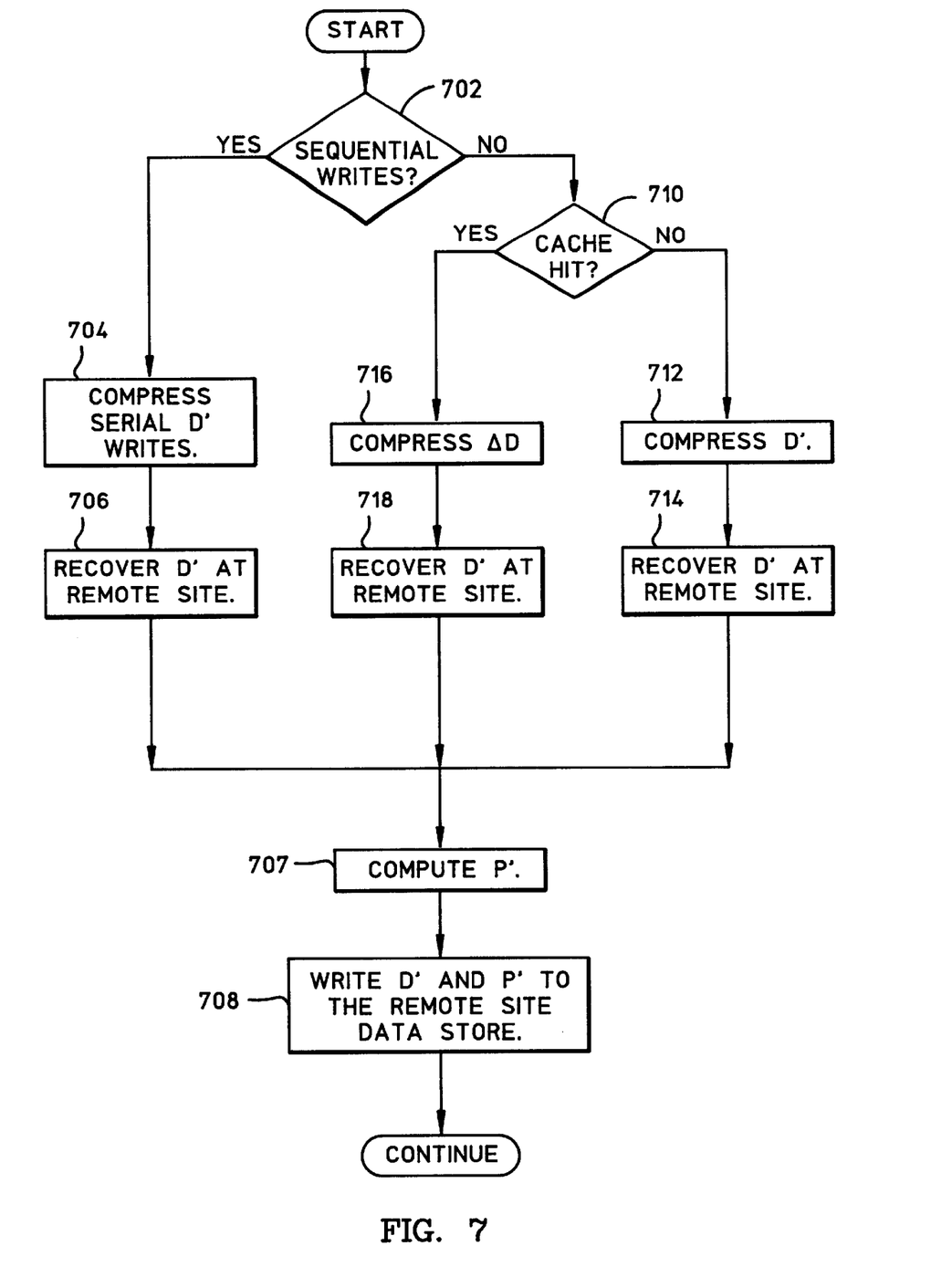
FIG. 7 is a flow diagram that illustrates the operational steps performed by the computer storage facility illustrated in FIG. 1 when checking for sequential write updates and cache hits.

FIG. 7 shows that the first step of operation at the primary store 104 is to check for sequential write operations, as represented by the decision box numbered 702. Sequential write operations might occur, for example, if a large block of data comprising six serial blocks D1, D2, D1, D4, D5, and D6 were changed and were to be written sequentially to the primary data store. Rather than update the mirror files at the remote site one by one, the system 102 configured according to FIG. 7 can recognize that parity, for example, can be calculated once and be written for the entire group of six blocks, rather than calculated and written once for each of the six blocks.

If there are sequential write operations, a positive outcome at the decision box 702, then the serial D' blocks (that is, D1', D2', D3', D4', D5', and D6') are compressed and sent to the remote site. This step is indicated by the flow diagram box numbered 704. Next, as represented by the box 706, the compressed D' blocks are received at the remote site and are decompressed, to recover the D' blocks. Those skilled in the art will appreciate that the parity for the new sequentially rewritten D' blocks can be calculated just once, using all six changed D' blocks, rather than repeatedly for each of the six changed D' blocks. This calculation is represented by the flow diagram box numbered 707. The next step is then to write the new D' blocks and the new P' parity blocks at the remote site data store. This step is represented by the flow diagram box numbered 708.

If no sequential writes were indicated, a negative outcome at the decision box numbered 702, then the system 102 configured per FIG. 7 checks for a cache hit at the decision box numbered 710. If there is no cache hit, a negative outcome, then processing at the next flow diagram box 712 follows the processing described above for box 604 of FIG. 6 to compress D', and processing for the flow diagram box numbered 714 follows the processing described above for the box 606 of FIG. 6 to recover D' at the remote site. If there was a cache hit, a positive outcome at the decision box 710, then the next processing step is to calculate the ΔD block, compress it, and send the compressed ΔD to the remote site. This processing follows the steps described above in conjunction with the box 610 of FIG. 6 for a cache hit. The next step, represented by the flow diagram box numbered 718, is to recover the D' update block at the remote site. This processing duplicates the processing described above for the recovery processing of box 612 in FIG. 6.

In each case described for FIG. 7, whether or not there were sequential writes or a cache hit, the D' block is recovered at the remote site, and once the D' and P' blocks are obtained, they are written to the remote site data store. In most cases, the amount of bandwidth needed between the primary store and the remote site is reduced because the changed bytes in the update block D' are identified and the unchanged bytes are not sent to the remote site. As before, the operation of FIG. 7 can incorporate accounting for NVS, if desired.

As noted above, it is typical for RAID systems to include an XOR logic engine and a data compressor, and the present invention is especially suited to such systems. The XOR logic engine and data compressor typically comprise dedicated hardware that are part of the RAID system, and which the present invention can conveniently utilize. Thus, the greater efficiency of the present invention is not achieved at the cost of providing additional system resources. The present invention, however, also has application to data storage systems that do not have integrated XOR logic and data compressors. For example, in a system lacking a data compressor, the disk controller CPU can be used to check for zero bytes in the update block, thereby determining unchanged bytes. Such checking can be performed either byte by byte or data sector by data sector. In a system lacking an XOR logic engine, a program routine can be implemented in a software application to perform the logical operations and produce XOR results. In such circumstances, the performance gains achieved by the present invention do not require significant additional resources.

Figure 8:
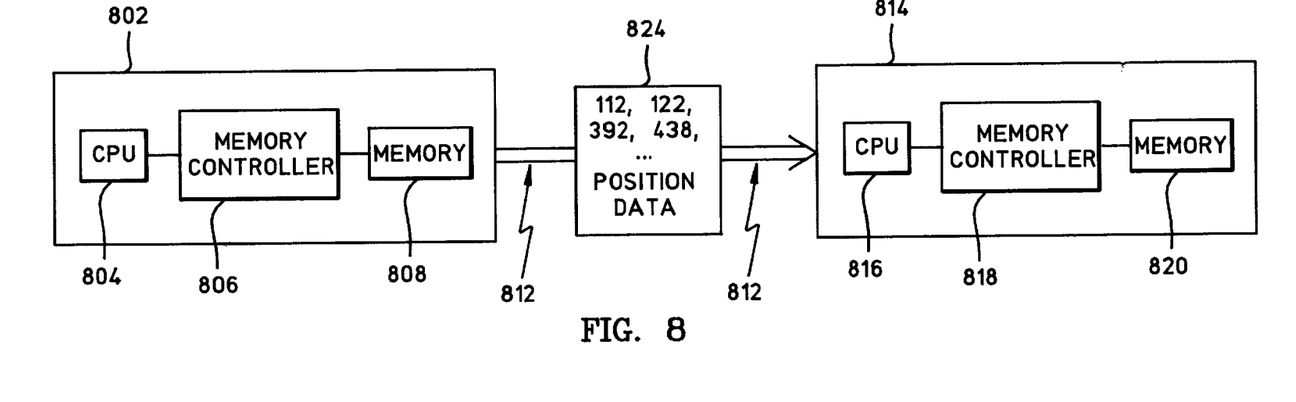
FIG. 8 is a block diagram representation of a storage facility having disk controllers with no XOR logical engine and no data compression facility, but constructed in accordance with the present invention.

FIG. 8 is a block diagram representation of a data storage system that includes two disk controllers, neither of which has an XOR logic engine or a data compressor. The first disk controller 802 is located at a primary storage facility, and includes a CPU 804, memory controller 806, and a disk controller memory 808. The disk controller memory can include a variety of program memory, data cache, and other non-volatile store, as described above in conjunction with FIG. 2. The controller 802 of the primary storage facility communicates over a high-speed data connection 812 with a disk controller 814 of a remote storage facility. Like the first controller 802, the second disk controller 814 includes a CPU 816, memory controller 818, and memory 820, but no XOR logic engine or data compressor.

The primary controller 802 identifies changed data from an original block D and sends the identified changes alone to the remote controller by executing program memory instructions that compare the original block D and the updated block D', and produce a non-zero character only when a difference is found. The primary controller 802 sends information 824 to the remote controller 814 that identifies where in the updated block D' there are any differences from D by setting non-zero bits in a result vector (such as ΔD). For example, the information may comprise informing the remote controller that bits 112, 122, 392, and 438 in a 512-bit block are non-zero. This information means that only these bits were changed in updating the 512-byte block D to the 512-byte block D'. In this way, the position of the non-zero results is identified with respect to the data of the updated block. At the remote site, the changed bit information is received and the updated block D' can be reconstituted because the original block D is available at the remote site, and the remote site controller simply changes the indicated bits in the original block D.

Providing information as to which bits in a comparison of D and D' are non-zero provides the equivalent information that otherwise would be obtained from an XOR logical engine and a data compression facility. Both of these functions can be performed under control of the disk controller CPU by executing appropriate steps in program memory, should the disk controller lack access to an XOR engine or data compressor. That is, the information 824 provided by the system of FIG. 8 to the remote controller 814 is the same information that was provided by the system of FIGS. 2 and 3 by sending the compressed ΔD and/or D' blocks to the remote site. Although the information can be generated through a byte-by-byte or block comparison, depending on what is supported by the machine instruction set, the information can be organized and conveyed at the byte level or data sector level, so long as the information is sufficient for the remote controller to reconstitute the D' block.

Thus, the present invention provides a data storage facility with a remote copy operation that copies data write updates from a primary data store to a remote site by identifying which bytes in a file update have changed and sending only the changed bytes from the primary data store to the remote site. An exclusive-OR (XOR) logic operation is used to identify the changed bytes by XOR'the original data block with the changed block. Data compression can then be used on the XOR data block to delete the unchanged bytes, and when the compressed block is sent to the remote site, only the unchanged bytes will be sent, thereby reducing the bandwidth needed between the primary store and the remote site.

The present invention has been described above in terms of presently preferred embodiments so that an understanding of the present invention can be conveyed. There are, however, many configurations for data storage facilities not specifically described herein but with which the present invention is applicable. The present invention should therefore not be seen as limited to the particular embodiments described herein, but rather, it should be understood that the present invention has wide applicability with respect to data storage facilities generally. All modifications, variations, or equivalent arrangements and implementations that are within the scope of the attached claims should therefore be considered within the scope of the invention.

I claim:

1. A method of sending changed data from a primary data store to a remote site over a data line of a given bandwidth, the method comprising the steps of:
   (a) receiving a changed data block comprising changes to an original digital data block;
   (b) identifying the changed bytes, comprising bytes in the changed data block that are different from corresponding bytes in the original digital data block, by carrying out a data transformation operation, wherein the data transformation operation provides a reduction in the given bandwidth required on the data line by allowing only the changed bytes within the changed data block to be sent, and sending data change information from the primary store to the remote site;
   (c) recovering the changed bytes at the remote site by performing an inverse transformation operation on the data change information to produce the changed data block; and
   (d) storing the changed data block at the remote site.

2. A method as defined in claim 1, wherein the step of identifying the changed bytes comprises performing an exclusive-OR logical operation on the changed data block with the original digital data block to produce a delta data change block comprising the identified changed bytes.

3. A method as defined in claim 2, further including the step of performing a data compression operation on the delta data change block.

4. A method as defined in claim 3, wherein the data transformation and data compression steps are performed using an XOR logic engine and a data compressor of a RAID system.

5. A method as defined in claim 2, wherein the step of recovering the changed bytes at the remote site comprises performing a data decompression operation on the received delta data change block and performing an exclusive-OR logical operation on the decompressed delta data change block to produce the changed data block comprising the identified changed bytes.

6. A method as defined in claim 1, wherein the step of identifying the changed bytes comprises comparing data in the original digital data block with data in the changed data block and indicating a non-zero result whenever there is a difference, and identifying the position of the non-zero results with respect to the data of the changed data block.

7. A method as defined in claim 1, wherein the data transformation operation comprises the steps of comparing the data in the original digital data block with the data in the changed data block, indicating a non-zero result whenever there is a difference, and identifying the position of the non-zero results with respect to the data of the changed data block.

8. A method as defined in claim 1, wherein the step of receiving a changed data block comprises:
   (i) determining if the original digital data block is located in a primary store data cache;
   (ii) performing a data compression operation on the changed data block if there was no cache hit, and
   (iii) performing an exclusive-OR logical operation on the changed data block with the original digital data block to produce a delta data change block comprising the identified changed bytes, and performing a data compression operation on the delta data change block, if there was a cache hit.

9. A data storage facility comprising:
   a primary data store that receives a changed data block comprising changes to an original digital data block;
   a controller at the primary data store that identifies the changed bytes, comprising bytes in the changed data block that are different from corresponding bytes in the original digital data block, by carrying out a data transformation operation, wherein the data transformation operation provides a reduction in the given bandwidth required on the data line by allowing only the changed bytes within the changed data block to be sent, and then sends data change information over a data line of a given bandwidth;
   a remote site that receives the changed bytes from the data line and recovers the changed bytes by performing an inverse transformation operation to produce the changed data block; and
   a controller at the remote site that stores the changed data block in data store at the remote site.

10. A data storage facility as defined in claim 9, wherein the primary data store identifies the changed bytes by performing an exclusive-OR logical operation on the changed data block with the original digital data block to produce a delta data change block comprising the identified changed bytes.

11. A data storage facility as defined in claim 10, wherein the primary data store performs a data compression operation on the delta data change block.

12. A data storage facility as defined in claim 10, wherein the remote site recovers the changed bytes by performing a data decompression operation on the received delta data change block and performing an exclusive-OR logical operation on the decompressed delta data change block to produce the changed data block comprising the identified changed bytes.

13. A data storage facility as defined in claim 9, wherein the remote site receives a changed data block by performing the steps of:
   (i) determining if the original digital data block is located in a primary store data cache;
   (ii) performing a data compression operation on the changed data block if there was no cache hit, and
   (iii) performing an exclusive-OR logical operation on the changed data block with the original digital data block to produce a delta data change block comprising the identified changed bytes, and performing a data compression operation on the delta data change block, if there was a cache hit.

14. A data storage facility as defined in claim 9, wherein the controller at the primary data store identifies the changed bytes by comparing data in the original digital data block with data in the changed data block and indicating a non-zero result whenever there is a difference, and identifying the position of the non-zero results with respect to the data of the changed data block.

15. A data storage facility as defined in claim 9, wherein the remote site controller performs the inverse transformation operation by receiving position information concerning data in the changed data block that are different from the original data block, and reconstitutes the changed data block by making the indicated changes to the original data block.

16. A primary data store comprising:
   a primary data store memory controller that receives a changed data block comprising changes to an original digital data block and identifies the changed bytes, comprising bytes in the changed data block that are different from corresponding bytes in the original digital data block, by carrying out a data transformation operation, wherein the data transformation operation provides a reduction in the given bandwidth required on the data line by allowing only the changed bytes within the changed data block to be sent;
   a network interface to a data line of a given bandwidth over which the transformed changed data block is sent to a remote site that receives the changed bytes from a data network connection and recovers the changed bytes by performing an inverse transformation operation to produce the changed data block for storing the changed data block in data store at the remote site.

17. A primary data store as defined in claim 16, wherein the primary data store memory controller identifies the changed bytes by performing an exclusive-OR logical operation on the changed data block with the original digital data block to produce a delta data change block comprising the identified changed bytes.

18. A primary data store as defined in claim 17, wherein the primary data store memory controller performs a data compression operation on the delta data change block.

19. A primary data store as defined in claim 16, wherein the primary data store memory controller identifies the changed bytes by comparing data in the original digital data block with data in the changed data block and indicating a non-zero result whenever there is a difference, and identifying the position of the non-zero results with respect to the data of the changed data block.

20. A remote site data store comprising:
   a remote site memory controller that receives changed bytes from a primary store, the changed bytes comprising changes to an original digital data block wherein changed bytes have been identified as being different from corresponding bytes in the original digital data block by carrying out a data transformation operation on the changed bytes, wherein the data transformation operation provides a reduction in the given bandwidth required on the data line by allowing only the changed bytes within the changed data block to be sent, and;
   a network interface to a data line of a given bandwidth over which the changed bytes are received;
   wherein the remote site memory controller receives the changed bytes and recovers the changed bytes by performing an inverse transformation operation to produce the changed data block for storing the changed data block in data store at the remote site.

21. A remote site data store as defined in claim 20, wherein the remote site recovers the changed bytes by performing a data decompression operation on the received delta data change block and performing an exclusive-OR logical operation on the decompressed delta data change block to produce the changed data block comprising the identified changed bytes.

22. A remote site data store as defined in claim 20, wherein the remote site controller performs the inverse transformation operation by receiving position information concerning data in the changed data block that are different from the original data block, and reconstitutes the changed data block by making the indicated changes to the original data block.

23. A remote site data store as defined in claim 20, wherein the remote site memory controller receives a changed data block by performing the steps of:
   (i) determining if the original digital data block is located in a primary store data cache;
   (ii) performing a data compression operation on the changed data block if there was no cache hit, and
   (iii) performing an exclusive-OR logical operation on the changed data block with the original digital data block to produce a delta data change block comprising the identified changed bytes, and performing a data compression operation on the delta data change block, if there was a cache hit.

24. A program product having a signal-bearing medium tangibly embodying a program of machine-readable instructions executable by a digital processing apparatus to perform a method of sending changed data from a primary data store to a remote site over a data line of a given bandwidth, the method to be performed comprising the steps of:
   (a) receiving a changed data block comprising changes to an original digital data block;
   (b) identifying the changed bytes, comprising bytes in the changed data block that are different from corresponding bytes in the original digital data block, by carrying out a data transformation operation, wherein the data transformation operation provides a reduction in the given bandwidth required on the data line by allowing only the changed bytes within the changed data block to be sent, and sending data change information from the primary store to the remote site;
   (c) recovering the changed bytes at the remote site by performing an inverse transformation operation on the data change information to produce the changed data block; and
   (d) storing the changed data block at the remote site.

25. A program product as defined in claim 24, wherein the step of identifying the changed bytes comprises performing an exclusive-OR logical operation on the changed data block with the original digital data block to produce a delta data change block comprising the identified changed bytes.

26. A program product as defined in claim 25, further including the step of performing a data compression operation on the delta data change block.

27. A program product as defined in claim 25, wherein the step of recovering the changed bytes at the remote site comprises performing a data decompression operation on the received delta data change block and performing an exclusive-OR logical operation on the decompressed delta data change block to produce the changed data block comprising the identified changed bytes.

28. A program product as defined in claim 24, wherein the step of identifying the changed bytes comprises comparing data in the original digital data block with data in the changed data block and indicating a non-zero result whenever there is a difference, and identifying the position of the non-zero results with respect to the data of the changed data block.

29. A program product as defined in claim 24, wherein the data transformation operation comprises the steps of comparing the data in the original digital data block with the data in the changed data block, indicating a non-zero result whenever there is a difference, and identifying the position of the non-zero results with respect to the data of the changed data block.

30. A program product as defined in claim 24, wherein the step of receiving a changed data block comprises:
  (i) determining if the original digital data block is located in a primary store data cache;
  (ii) performing a data compression operation on the changed data block if there was no cache hit, and
  (iii) performing an exclusive-OR logical operation on the changed data block with the original digital data block to produce a delta data change block comprising the identified changed bytes, and performing a data compression operation on the delta data change block, if there was a cache hit.

31. A method of sending changed data from a primary data store to a remote site over a data line of a given bandwidth, the method comprising the steps of:
  receiving a changed data block comprising changes to an original digital data block;
  identifying the changed bytes, comprising bytes in the changed data block that are different from corresponding bytes in the original digital data block, by carrying out a data transformation operation, wherein the data transformation operation provides a reduction in the given bandwidth required on the data line by allowing only the changed bytes within the changed data block to be sent, and sending data change information from the primary store to the remote site;
  recovering the changed bytes at the remote site by performing an inverse transformation operation on the data change information to produce the changed data block; and
  storing the changed data block at the remote site;
    wherein the step of receiving a changed data block comprises:
      determining if the changed data blocks will involve sequential write operations,
      performing a data compression operation on the changed data block if sequential write operations will be involved, such that the compressed changed data block will be sent to the remote site, and then proceeding with the step of recovering the changed bytes, and
      proceeding with the step of identifying the changed bytes if no sequential write operations will be involved.

32. A method of sending changed data from a primary data store to a remote site over a data line of a given bandwidth, the method comprising the steps of:
  receiving a changed data block comprising changes to an original digital data block;
  identifying the chanced bytes, comprising bytes in the changed data block that are different from corresponding bytes in the original digital data block, by carrying out a data transformation operation, wherein the data transformation operation provides a reduction in the given bandwidth required on the data line by allowing only the changed bytes within the changed data block to be sent, and sending data change information from the primary store to the remote site;
  recovering the changed bytes at the remote site by performing an inverse transformation operation on the data change information to produce the changed data block; and
  storing the changed data block at the remote site;
    wherein the step of receiving a changed data block comprises:
      determining if the changed data blocks will involve sequential write operations,
      performing a data compression operation on the changed data block if sequential write operations will be involved, such that the compressed changed data block will be sent to the remote site, and
    performing the cache checking steps of
      determining if the original digital data block is located in a primary store data cache;
      performing a data compression operation on the changed data block if there was no cache hit, and
      performing an exclusive-OR logical operation on the changed data block with the original digital data block to produce a delta data change block comprising the identified changed bytes, and performing a data compression operation on the delta data change block, if there was a cache hit.

33. A data storage facility comprising:
  a primary data store that receives a changed data block comprising changes to an original digital data block;
  a controller at the primary data store that identifies the changed bytes, comprising bytes in the changed data block that are different from corresponding bytes in the original digital data block, by carrying out a data transformation operation, wherein the data transformation operation provides a reduction in the given bandwidth required on the data line by allowing only the chanced bytes within the changed data block to be sent, and then seeds data change information over a data line of a given bandwidth;
  a remote site that receives the changed bytes from the data line and recovers the changed bytes by performing an inverse transformation operation to produce the changed data block; and
  a controller at the remote site that stores the changed data block in data store at the remote site;
    wherein the remote site receives a changed data block by performing the steps of:
      determining if the changed data blocks will involve sequential write operations,
      performing a data compression operation on the changed data block if sequential write operations will be involved, such that the compressed changed data block will be sent to the remote site, and then recovering the changed bytes with the inverse transformation operation, and otherwise
    proceeding with identification of changed bytes if no sequential write operations will be involved.

34. A data storage facility comprising:
  a primary data store that receives a changed data block comprising changes to an original digital data block;

a controller at the primary data store that identifies the changed bytes, comprising bytes in the changed data block that are different from corresponding bytes in the original digital data block, by carrying out a data transformation operation, wherein the data transformation operation provides a reduction in the given bandwidth required on the data line by allowing only the changed bytes within the changed data block to be sent, and then sends data change information over a data line of a given bandwidth;

a remote site that receives the chanced bytes from the data line and recovers the changed bytes by performing an inverse transformation operation to produce the changed data block; and a controller at the remote site that stores the changed data block in data store at the remote site;

wherein the remote site receives a changed data block by performing the steps of:

determining if the changed data blocks will involve sequential write operations, performing a data compression operation on the changed data block if sequential write operations will be involved, such that the compressed changed data block will be sent to the remote site, and performing the cache checking steps of determining if the original digital data block is located in a primary store data cache;

performing a data compression operation on the changed data block if there was no cache hit, and performing an exclusive-OR logical operation on the changed data block with the original digital data block to produce a delta data change block comprising the identified changed bytes, and performing a data compression operation on the delta data change block, if there was a cache hit.

35. A remote site data store comprising:

a remote site memory controller that receives changed bytes from a primary store, the changed bytes comprising changes to an original digital data block wherein changed bytes have been identified as being different from corresponding bytes in the original digital data block by carrying out a data transformation operation on the changed bytes, wherein the data transformation operation provides a reduction in the given bandwidth required on the data line by allowing only the changed bytes within the changed data block to be sent, and;

a network interface to a data line of a given bandwidth over which the changed bytes are received;

wherein the remote site memory controller receives the changed bytes and recovers the changed bytes by performing an inverse transformation operation to produce the changed data block for storing the changed data block in data store at the remote site, and wherein the remote site memory controller receives a changed data block by performing the steps of:

determining if the changed data blocks will involve sequential write operations, performing a data compression operation on the changed data block if sequential write operations will be involved, such that the compressed changed data block will be sent to the remote site, and then recovering the changed bytes with the inverse transformation operation, and otherwise proceeding with identification of changed bytes if no sequential write operations will be involved.

36. A remote site data store comprising:

a remote site memory controller that receives changed bytes from a primary store, the changed bytes comprising changes to an original digital data block wherein changed bytes have been identified as being different from corresponding bytes in the original digital data block by carrying out a data transformation operation on the changed bytes, wherein the data transformation operation provides a reduction in the given bandwidth required on the data line by allowing only the changed bytes within the changed data block to be sent, and;

a network interface to a data line of a given bandwidth over which the changed bytes are received;

wherein the remote site memory controller receives the changed bytes and recovers the changed bytes by performing an inverse transformation operation to produce the changed data block for storing the changed data block in data store at the remote site, and wherein the remote site receives a changed data block by performing the steps of:

determining if the changed data blocks will involve sequential write operations, performing a data compression operation on the changed data block if sequential write operations will be involved, such that the compressed changed data block will be sent to the remote site, and performing the cache checking steps of determining if the original digital data block is located in a primary store data cache;

performing a data compression operation on the changed data block if there was no cache hit, and performing an exclusive-OR logical operation on the changed data block with the original digital data block to produce a delta data change block comprising the identified changed bytes, and performing a data compression operation on the delta data change block, if there was a cache hit.

37. A program product having a signal-bearing, medium tangibly embodying a program of machine-readable instructions executable by a digital processing apparatus to perform a method of sending changed data from a primary data store to a remote site over a data line of a given bandwidth, the method to be performed comprising the steps of:

receiving a changed data block comprising changes to an original digital data block;

identifying the changed bytes, comprising bytes in the changed data block that are different from corresponding bytes in the original digital data block, by carrying out a data transformation operation, wherein the data transformation operation provides a reduction in the given bandwidth required on the data line by allowing only the changed bytes within the changed data block to be sent, and sending data change information from the primary store to the remote site;

recovering the changed bytes at the remote site by performing an inverse transformation operation on the data change information to produce the changed data block; and storing the changed data block at the remote site;

wherein the step of receiving a changed data block comprises:

determining if the changed data blocks will involve sequential write operations, performing a data compression operation on the changed data block if sequential write operations will be involved, such that the compressed changed data block will be sent to the remote site, and then proceeding with the step of recovering the changed bytes, and proceeding with the step of identifying the changed bytes if no sequential write operations will be involved.

38. A program product having a signal-bearing medium tangibly embodying a program of machine-readable instructions executable by a digital processing apparatus to perform a method of sending changed data from a primary data store to a remote site over a data line of a given bandwidth, the method to be performed comprising the steps of:

receiving a changed data block comprising changes to an original digital data block;

identifying the changed bytes, comprising bytes in the changed data block that are different from corresponding bytes in the original digital data block, by carrying out a data transformation operation, wherein the data transformation operation provides a reduction in the given bandwidth required on the data line by allowing only the changed bytes within the changed data block to be sent, and sending data change information from the primary store to the remote site;

recovering the changed bytes at the remote site by performing an inverse transformation operation on the data change information to produce the changed data block; and storing the changed data block at the remote site;

wherein the step of receiving a changed data block comprises:

determining if the changed data blocks will involve sequential write operations, performing a data compression operation on the changed data block if sequential write operations will be involved, such that the compressed changed data block will be sent to the remote site, and performing the cache checking steps of determining if the original digital data block is located in a primary store data cache;

performing a data compression operation on the changed data block if there was no cache hit, and performing an exclusive-OR logical operation on the changed data block with the original digital data block to produce a delta data change block comprising the identified changed bytes, and performing a data compression operation on the delta data change block, if there was a cache hit.

* * * * *